(12) United States Patent
Seo et al.

(10) Patent No.: US 9,693,315 B2
(45) Date of Patent: Jun. 27, 2017

(54) METHOD AND APPARATUS FOR TRANSMITTING UPLINK SIGNAL IN WIRELESS COMMUNICATION SYSTEM

(71) Applicant: LG ELECTRONICS INC., Seoul (KR)

(72) Inventors: Inkwon Seo, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/783,800

(22) PCT Filed: Apr. 11, 2014

(86) PCT No.: PCT/KR2014/003143
§ 371 (c)(1),
(2) Date: Oct. 9, 2015

(87) PCT Pub. No.: WO2014/168448
PCT Pub. Date: Oct. 16, 2014

(65) Prior Publication Data
US 2016/0073354 A1    Mar. 10, 2016

Related U.S. Application Data

(60) Provisional application No. 61/810,749, filed on Apr. 11, 2013.

(51) Int. Cl.
*H04B 7/00* (2006.01)
*H04W 52/14* (2009.01)
(Continued)

(52) U.S. Cl.
CPC ............ *H04W 52/146* (2013.01); *H04B 7/26* (2013.01); *H04L 5/0073* (2013.01); *H04L 5/14* (2013.01); *H04W 72/0473* (2013.01)

(58) Field of Classification Search
CPC ............. H04W 52/146; H04W 52/243; H04W 72/0473; H04W 52/38; H04W 72/0413;
(Continued)

(56) References Cited

U.S. PATENT DOCUMENTS 9,246,663 B2 * 1/2016 Yin ....................... H04L 5/0092
2012/0263057 A1 10/2012 Choi et al.
(Continued)

FOREIGN PATENT DOCUMENTS

KR    10-2013-0033997    4/2013
WO    2012/128490        9/2012

OTHER PUBLICATIONS

Samsung, "Power control in flexible subframes for eIMTA," 3GPP TSG RAN WG1 #72, R1-130290, Jan. 2013, 3 pages.
(Continued)

*Primary Examiner* — Keith Ferguson
(74) *Attorney, Agent, or Firm* — Lee, Hong, Degerman, Kang & Waimey

(57) ABSTRACT

One embodiment of the present invention provides a method for transmitting an uplink signal by a terminal in a wireless communication system, comprising the steps of: receiving allocated resources for transmitting an uplink signal from a serving cell; and transmitting the uplink signal through the allocated resources wherein, when a subframe corresponding to a first subframe comprising the allocated resources is used for transmitting a downlink in a neighbor cell of the serving cell, a first set comprising a parameter value associated with the transmission power for transmitting the uplink signal is different from a second set comprising a parameter value associated with the transmission power for transmitting an uplink signal in a second subframe corresponding to a subframe used for an uplink in the neighbor cell.

12 Claims, 8 Drawing Sheets

(51) Int. Cl.
*H04B 7/26* (2006.01)
*H04L 5/00* (2006.01)
*H04L 5/14* (2006.01)
*H04W 72/04* (2009.01)

(58) Field of Classification Search
CPC ........... H04W 74/004; H04W 36/0061; H04W 52/04
USPC ........... 455/522, 69, 127.1, 127.2, 509, 450, 455/452.1, 445, 422.1, 403, 550.1, 515, 455/426.1, 426.2, 524, 73, 434, 444; 370/329, 252, 280, 328, 330, 336, 318, 370/310, 338
See application file for complete search history.

(56) References Cited

U.S. PATENT DOCUMENTS

2014/0177486 A1\* 6/2014 Wang .................... H04L 5/0053
                                                  370/280
2014/0177602 A1\* 6/2014 Chen .................... H04W 52/04
                                                  370/336

OTHER PUBLICATIONS

Samsung, "False alarm handling in UL-DL reconfiguration," 3GPP TSG RAN WG1 #72, R1-130292, Jan. 2013, 3 pages.
PCT International Application No. PCT/KR2014/003143, Written Opinion of the International Searching Authority dated Jul. 28, 2014, 18 pages.

\* cited by examiner

METHOD AND APPARATUS FOR TRANSMITTING UPLINK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/003143, filed on Apr. 11, 2014, which claims the benefit of U.S. Provisional Application No. 61/810,749, filed on Apr. 11, 2013, the contents of which are hereby incorporated by reference herein in their entirety.

TECHNICAL FIELD

The present invention relates to a wireless communication system, and more particularly, to a method and apparatus for controlling an uplink signal transmission power when a downlink subframe is used as an uplink subframe by its usage change.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

One object of the present invention is to provide a method for controlling an uplink signal transmission power when a downlink subframe is used as an uplink subframe by its usage change in a time division duplex (TDD) mode.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for transmitting an uplink signal by a user equipment in a wireless communication system comprises: being allocated with resources for transmitting the uplink signal from a serving cell; and transmitting the uplink signal through the allocated resources, wherein, when a subframe corresponding to a first subframe that include the allocated resources are used for downlink transmission in a neighboring cell of the serving cell, a first set comprising parameter values associated with a transmission power for transmitting the uplink signal is different from a second set comprising parameter values associated with a transmission power for uplink signal transmission at a second subframe corresponding to a subframe used for an uplink in the neighboring cell.

In a second technical aspect of the present invention, a user equipment for transmitting an uplink signal in a wireless communication system comprises a transmission module; and a processor, wherein the processor is allocated with resources for transmitting the uplink signal from a serving cell and transmits the uplink signal through the allocated resources, and when a subframe corresponding to a first subframe that include the allocated resources are used for downlink transmission in a neighboring cell of the serving cell, a first set comprising parameter values associated with a transmission power for transmitting the uplink signal is different from a second set comprising parameter values associated with a transmission power for uplink signal transmission at a second subframe corresponding to a subframe used for an uplink in the neighboring cell.

The first and second technical aspects of the present invention may include all/some of the followings.

An absolute value of a difference between two of the parameter values included in the first set may be greater than that of a difference between two of the parameter values included in the second set.

Each of the parameter values included in the first set may be an integer multiple of each of the parameter values included in the second set.

The first set may include only the parameter values corresponding to positive numbers.

The second subframe may be those other than a first uplink subframe which appears after the first subframe among the subframe corresponding to those used for the uplink in the neighboring cell.

A third set comprising parameter values associated with a transmission power at the first uplink subframe which appears after the first subframe may be different from the first set and the second set.

The third set may include only the parameter values corresponding to negative numbers.

The parameter values may be indicated by a transmit power control (TPC) command field.

When the uplink signal is transmitted through a physical uplink shared channel (PUSCH), the TPC command may be received together with the resource allocation.

The TPC command may be received through a control channel of a first downlink subframe among subframes prior to four subframes from the first subframe.

When the uplink signal is transmitted through a physical uplink control channel (PUCCH), the TPC command may be received together with downlink resource allocation.

The TPC command may be included in any one of downlink control information formats 1A, 1B, 1D, 1, 2A, 2B, 2C, 2D, 2, and 3.

Advantageous Effects

According to the present invention, problems of interference between base stations and transmission power control, which may occur when a downlink subframe is used as an uplink subframe by its usage change, may be solved.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
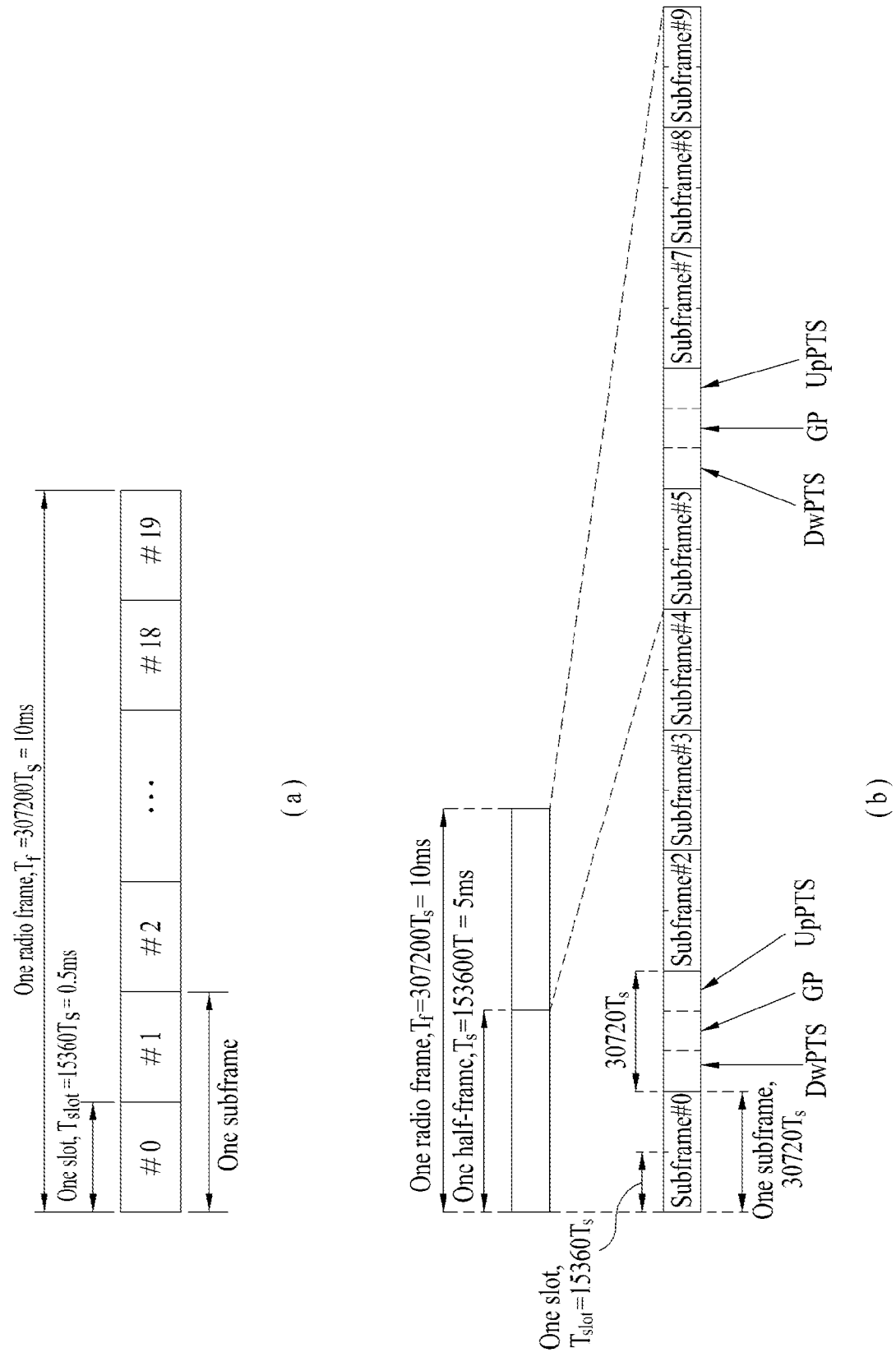
FIG. 1 is a diagram illustrating a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
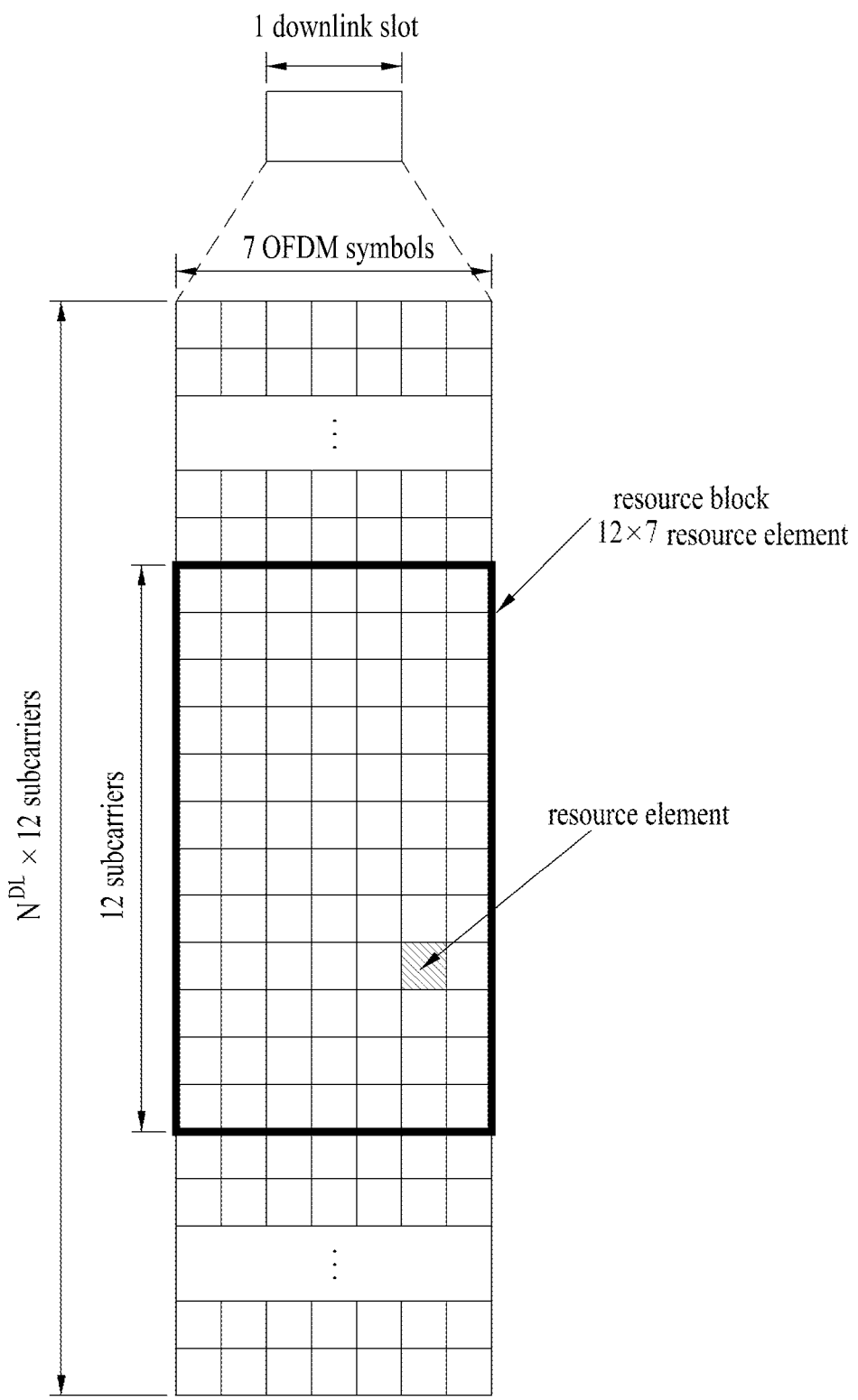
FIG. 2 is a diagram illustrating a resource grid at a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
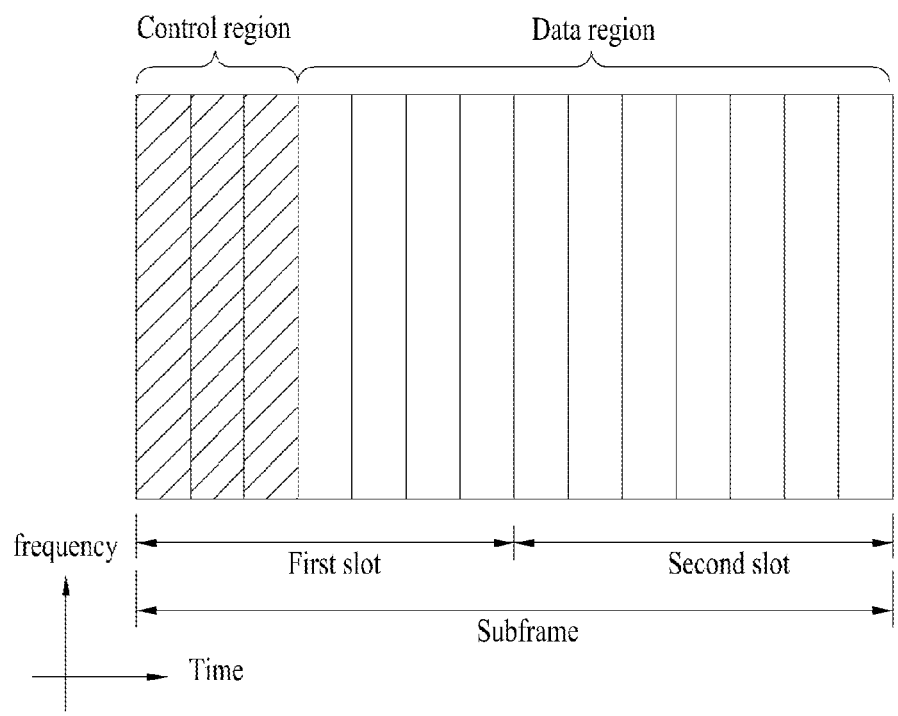
FIG. 3 is a diagram illustrating a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
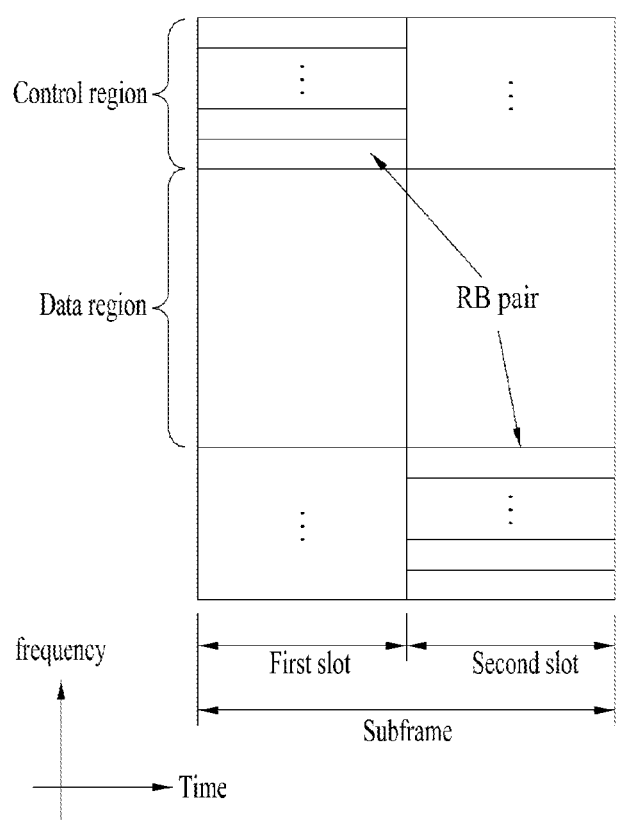
FIG. 4 is a diagram illustrating a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

DCI formats 0, 1, 1A, 1B, 1C, 1D, 2, 2A, 2B, 2C, 3, 3A and 4 are defined in the current LTE-A (Release 10). The DCI formats 0, 1A, 3 and 3A are defined to have the same message size to reduce the number of times of blind decoding, which will be described later. The DCI formats may be divided into i) the DCI formats 0 and 4 used for uplink grant, ii) the DCI formats 1, 1A, 1B, 1C, 1D, 2, 2A, 2B and 2C used for downlink scheduling allocation, and iii) the DCI formats 3 and 3A for power control commands depending on purposes of use of control information to be transmitted.

The DCI format 0 used for uplink grant may include a carrier indicator necessary for carrier aggregation, which will be described later, an offset (flag for format 0/format 1A differentiation) used to differentiate the DCI formats 0 and 1A from each other, a frequency hopping flag that indicates whether frequency hopping is used for uplink PUSCH transmission, information on resource block allocation, which should be used by a UE to transmit a PUSCH, a modulation and coding scheme, a new data indicator used to empty a buffer for initial transmission in relation to a HARQ process, a transmission power control (TPC) command for a scheduled PUSCH, information on a cyclic shift for a demodulation reference signal (DMRS) and OCC index, and a UL index and channel quality indicator request (CSI request) necessary for a TDD operation, etc. Meanwhile, the DCI format 0 does not include a redundancy version, unlike DCI formats related to downlink scheduling allocation since the DCI format 0 uses synchronous HARQ. The carrier offset is not included in the DCI formats when cross-carrier scheduling is not used.

The DCI format 4, which is newly added to DCI formats in the LTE-A Release 10, supports application of spatial multiplexing to uplink transmission in the LTE-A. The DCI format 4 has a larger message size because it further includes information for spatial multiplexing as compared with the DCI format 0. The DCI format 4 includes additional control information in addition to control information included in the DCI format 0. That is, the DCI format 4 further includes information on a modulation and coding scheme for the second transmission block, precoding information for multi-antenna transmission, and sounding reference signal (SRS) request information. Meanwhile, the DCI format 4 does not include an offset for differentiation between the DCI formats 0 and 1A because it has a larger size than that of the DCI format 0.

The DCI formats 1, 1A, 1B, 1C, 1D, 2, 2A, 2B and 2C related to downlink scheduling allocation may be broadly divided into the DCI formats 1, 1A, 1B, 1C and 1D, which do not support spatial multiplexing, and the DCI formats 2, 2A, 2B and 2C, which support spatial multiplexing.

The DCI format 1C supports only frequency contiguous allocation as compact downlink allocation and does not include carrier offset and redundancy version, compared to the other formats.

The DCI format 1A is for downlink scheduling and random access procedure. The DCI format 1A may include a carrier offset, an indicator that indicates whether downlink distributed transmission is used, PDSCH resource allocation information, a modulation and coding scheme, a redundancy version, a HARQ processor number for indicating a processor used for soft combining, a new data offset used to empty a buffer for initial transmission in relation to a HARQ process, a TPC command for a PUCCH, an uplink index necessary for a TDD operation, etc.

The DCI format 1 includes control information similar to that of the DCI format 1A. The DCI format 1 supports non-contiguous resource allocation, whereas the DCI format 1A is related to contiguous resource allocation. Accordingly, the DCI format 1 further includes a resource allocation header, and thus slightly increases control signaling overhead as a trade-off for an increase in flexibility of resource allocation.

Both the DCI formats 1B and 1D further include precoding information, compared to the DCI format 1. The DCI format 1B includes PMI acknowledgement and the DCI format 1D includes downlink power offset information. Most control information included in the DCI formats 1B and 1D corresponds to that of DCI format 1A.

The DCI formats 2, 2A, 2B and 2C basically include most control information included in the DCI format 1A and further include information for spatial multiplexing. The information for spatial multiplexing includes a modulation and coding scheme for the second transmission block, a new data offset, and a redundancy version.

The DCI format 2 supports closed loop spatial multiplexing, and the DCI format 2A supports open loop spatial multiplexing. Both the DCI formats 2 and 2A include precoding information. The DCI format 2B supports dual layer spatial multiplexing combined with beamforming and further includes cyclic shift information for a DMRS. The DCI format 2C, which may be understood as an extended version of the DCI format 2B, supports spatial multiplexing for up to 8 layers.

The DCI formats 3 and 3A may be used to complement transmission power control included in the aforementioned DCI formats for uplink grant and downlink scheduling allocation, namely, to support semi-persistent scheduling. A 1-bit command is used per UE in case of the DCI format 3, while a 2-bit command is used per UE in case of the DCI format 3A.

One of the DCI formats described above is transmitted through a PDCCH, and a plurality of PDCCHs may be transmitted in a control region. A UE may monitor the plurality of PDCCHs.

PUCCH

Uplink control information (UCI) transmitted through a PUCCH may include a scheduling request (SR), HARQ ACK/NACK information, and downlink channel measurement information.

The HARQ ACK/NACK information may be generated depending on whether decoding of a downlink data packet on a PDSCH is successful. In a conventional wireless communication system, 1 bit is transmitted as ACK/NACK information for downlink single codeword transmission and 2 bits are transmitted as ACK/NACK information downlink 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted through the PUCCH. When code division multiplexing (CDM) is performed to distinguish between signals of UEs, a constant amplitude zero autocorrelation (CAZAC) sequence with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to downlink data transmitted through the PUCCH is covered using an orthogonal sequence or orthogonal cover (OC).

In addition, control information transmitted on the PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may be varied depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In the 3GPP LTE system, the PUCCH is defined in seven different formats depending on transmitted control information, a modulation scheme and the amount of control information. Attributes of transmitted uplink control information (UCI) for each PUCCH format may be summarized as shown in Table 1.

TABLE 1

| PUCCH format | Modulation Scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
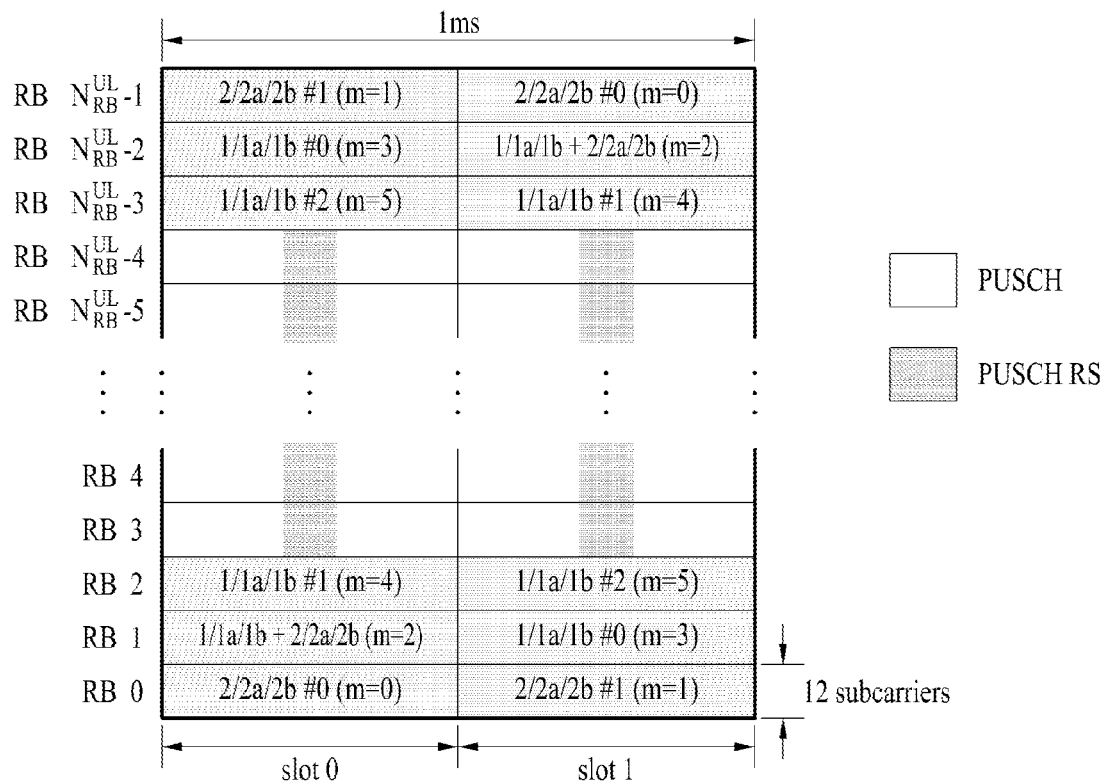
FIG. 5 is a diagram illustrating a mapping type of PUCCH formats in an uplink physical resource block.

FIG. 5 illustrates mapping of PUCCH formats to PUCCH regions in UL physical resource blocks. In FIG. 5, $N_{RB}^{UL}$ denotes the number of resource blocks on UL, and 0, 1, . . . , $N_{RB}^{UL}-1$ represent physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($N_{RB}^{(2)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
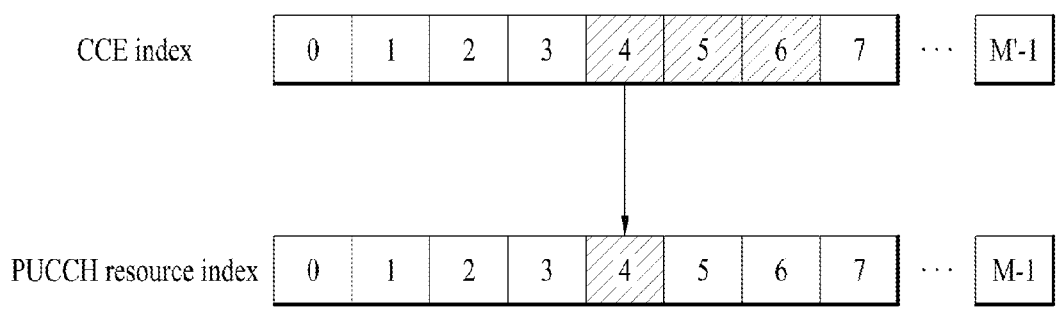
FIG. 6 is a diagram illustrating an example of determining a PUCCH resource for ACK/NACK.
Figure 7:
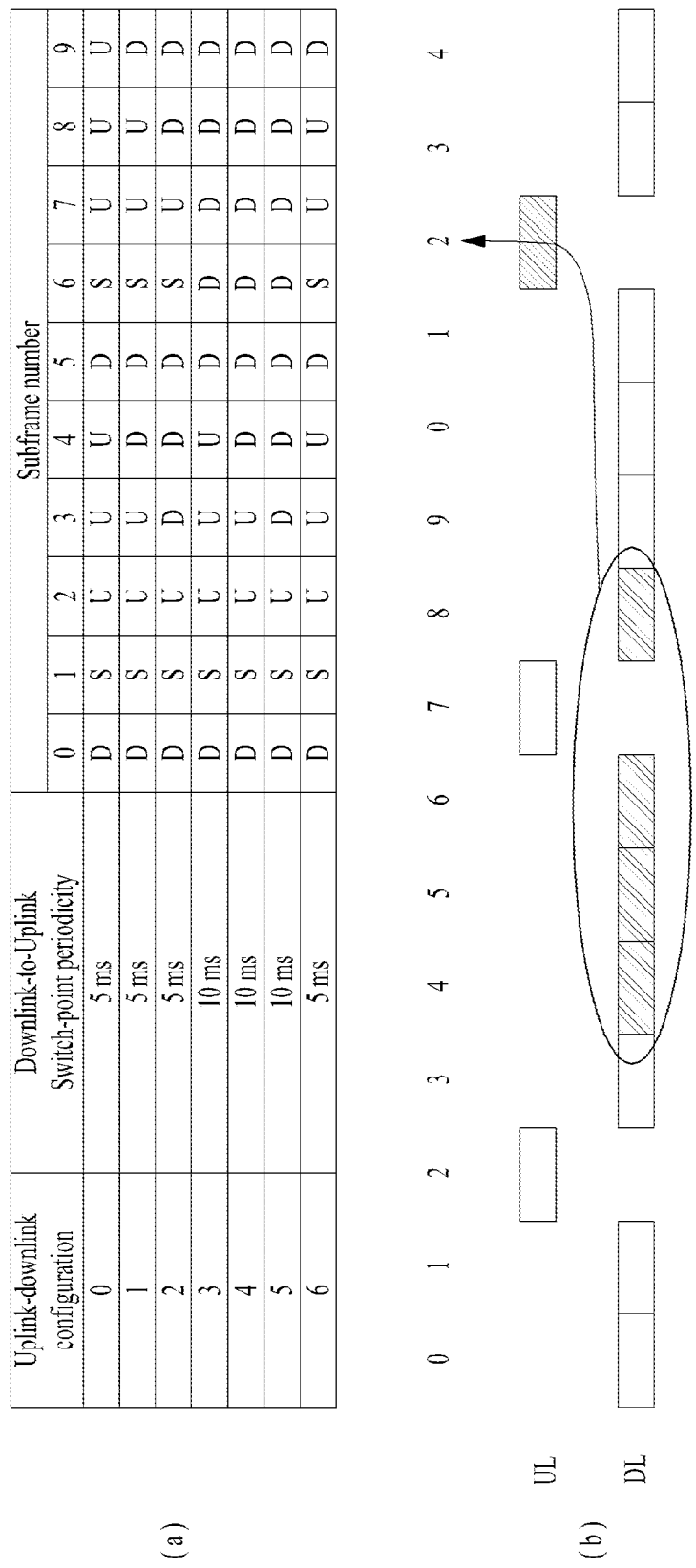
FIG. 7 is a diagram illustrating transmission of ACK/NACK in a TDD mode.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)}$$ Equation 1

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

Transmission of ACK/NACK in TDD

Meanwhile, in a TDD mode unlike FDD mode, a status may occur in that ACK/NACK (of PDSCH) of several downlink subframes should be transmitted from one uplink subframe by reason that an uplink (UL) and a downlink (DL) are divided from each other on a frequency band. This will be described with reference to FIG. 11. FIG. 11(a) illustrates uplink-downlink configuration used in a TDD mode, and FIG. 11(b) illustrates ACK/NACK of TDD uplink-downlink configuration 2. Referring to FIG. 11, subframes available for the uplink are limited to the subframes 2 and 7 in case of the TDD uplink-downlink configuration 2. Therefore, it is required that ACK/NACK of eight downlink subframes (including special subframe) should be transmitted through two uplink subframes (subframes 2 and 7). To this end, downlink associated set indexes are defined as illustrated in Table 2 below.

TABLE 2

| UL-DL con-figu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | (6) | — | [4] | — | — | [6] | — | [4] |
| | — | — | (6) | — | [0] | — | — | [1] | — | [5] |

TABLE 2-continued

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1 | — | — | (7, 6) | (4) | — | — | — | [7, 6] | [4] | — |
|   | — | — | (5, 6) | (9) | — | — | — | [0, 1] | [4] | — |
| 2 | — | — | (8, 7, 4, 6) | — | — | — | — | (8), [7, 4, 6] | — | — |
|   | — | — | (4, 5, 8, 6) | — | — | — | — | (9), [0, 3, 1] | — | — |
| 3 | — | — | (7, 6, 11) | (6, 5) | (5), [4] | — | — | — | — | — |
|   | — | — | (5, 6, 1) | (7, 8) | (9), [0] | — | — | — | — | — |
| 4 | — | — | (12, 8, 7, 11) | (6, 5, 4, 7) | — | — | — | — | — | — |
|   | — | — | (0, 4, 5, 1) | (7, 8, 9, 6) | — | — | — | — | — | — |
| 5 | — | — | 13, (12, 9, 8, 7, 5, 4, 11, 6) | — | — | — | — | — | — | — |
|   | — | — | 9, (0, 3, 4, 5, 7, 8, 1, 6) | — | — | — | — | — | — | — |
| 6 | — | — | (7) | (7) | (5) | — | — | [7] | [7] | — |
|   | — | — | (5) | (6) | (9) | — | — | [0] | [1] | — |

Downlink associated set K is comprised of elements of $\{k_0, k_1, \ldots k_{M-1}\}$ at each uplink subframe, and M (bundling window size) means the number of downlink subframes for which ACK/NACK should be transmitted from the associated set K. In each uplink-downlink configuration in Table 2, numbers in the first row indicate downlink subframes prior to several subframes from the current uplink subframe. For example, in case of the uplink-downlink configuration 2, as shown in FIG. 11(b), the subframe 2 transmits ACK/NACK of the subframes (i.e., subframes 4, 5, 8 and 6 of a previous radio frame) prior to the subframe 2 as much as 8, 7, 4 and 6 subframes. To facilitate understanding, a number of the subframe indicated by the number of the first row is marked in the second row of each uplink-downlink configuration. In case of the uplink-downlink configuration 2, 4, 5, 8 and 6 are displayed in the second row, and are numbers of downlink subframes to which the subframe 2 should transmit ACK/NACK. Also, in Table 2, parenthesis ( ) means a subframe of a previous radio frame, square bracket [ ] means a subframe of a current radio frame, and numbers having no bracket or square bracket mean subframes of a previous second radio frame.

Enhanced Interference Management and Traffic Adaptation, eIMTA

In case of a TDD mode, each subframe (except for special frame for uplink-downlink switching) may be set to be used for any one of an uplink and a downlink. In more detail, referring to Table 3 below, in case of uplink-downlink configuration 0, subframes 0 and 5 in one radio frame are previously set to be used for the downlink, and subframes 2, 3, 4, 7, 8 and 9 are previously set to be used for the uplink. Uplink-downlink configuration which will be used by a specific base station may be provided to a UE as a part of system information (for example, SIB 1). And, neighboring base stations may be forced to use the same TDD configuration, that is, uplink-downlink configuration by reason of interference, etc.

TABLE 3

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframe for downlink transmission, U: subframe for uplink transmission, S: special subframe)

Even in the case that the system is managed in accordance with uplink-downlink configuration as illustrated in Table 3, if the amount of data transmitted from each cell to the uplink or the downlink is increased rapidly, one or more subframes set for the uplink are switched to those for the downlink to actively transmit data, or one or more subframes set for the downlink are changed/switched to those for the uplink, whereby efficiency may be enhanced.

Switching from the uplink subframes to the downlink subframes may be made at the subframes shaded in Table 4 below. However, a change of a switching period is allowed in Table 4, and if the change of the switching period is not possible, subframes available through switching to the downlink are displayed as shaded portions in Table 4.

TABLE 4

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U* | U* | D | S* | U* | U* | U* |
| 1 | 5 ms | D | S | U | U* | D | D | S* | U* | U* | D |
| 2 | 5 ms | D | S | U | D | D | D | S* | U* | D | D |
| 3 | 10 ms | D | S | U | U* | U* | D | D | D | D | D |
| 4 | 10 ms | D | S | U | U* | D | D | D | D | D | D |
| 5 | 10 ms | D | D | U | D | D | D | D | D | D | D |
| 6 | 5 ms | D | S | U | U* | U* | D | S* | U* | U* | D |

TABLE 5

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U* | U* | D | S* | U* | U* | U* |
| 1 | 5 ms | D | S | U | U* | D | D | S* | U* | U* | D |
| 2 | 5 ms | D | S | U | D | D | D | S* | U* | D | D |
| 3 | 10 ms | D | S | U | U* | U* | D | D | D | D | D |
| 4 | 10 ms | D | S | U | U* | D | D | D | D | D | D |
| 5 | 10 ms | D | D | U | D | D | D | D | D | D | D |
| 6 | 5 ms | D | S | U | U* | U* | D | S* | U* | U* | D |

Also, switching of the uplink subframes to the downlink subframes may be set to satisfy the conventional TDD configuration. In other words, a purpose of use of the subframes is switched dynamically, it means that TDD uplink-downlink configuration after switching should be any one of the configurations in Table 3. In more detail, if the subframe 4 in the uplink-downlink configuration 0 is switched to the downlink subframe, it means that the subframe 9 should simultaneously be switched to the downlink subframe. In this case, it is advantageous in that switching of the uplink-downlink configuration may be indicated by 1 bit.

Uplink Power Control

Uplink power control is applied to the LTE/LTE-A system such that the LTE/LTE-A system may easily demodulate uplink control information, data, etc. The uplink power control may be classified into PUCCH power control, PUSCH power control, and UL Sounding Reference Signal (SRS) power control.

The PUCCH power control is determined considering the path loss, maximum transmission power of the UE, etc., such that control information transmitted through the PUCCH may be demodulated at a sufficiently low error rate.

In more detail, the PUCCH power control at the subframe i of the cell 'c' may be represented by the following Equation 2.

$$P_{PUCCH}(i) = \min\begin{Bmatrix} P_{CMAX,c}(i), P_{0\_PUCCH} + PL_c + \\ h(n_{CQI}, n_{HARQ}, n_{SR}) + \\ \Delta_{F\_PUCCH}(F) + \Delta_{TxD}(F') + g(i) \end{Bmatrix}[dBm] \quad [\text{Equation 2}]$$

In this case, $P_{CMAX,c}(i)$ means a maximum transmission power of the UE, and is used as the upper limit of the PUCCH power control command.

$P_{0\_PUCCH}$ is a desired PUCCH transmission power value to be received by the base station. This value is transmitted through higher layer signaling as a UE-specific parameter, and is determined to be the sum of nominal power values $P_{O\_NOMINAL\_PUCCH}$ and $P_{O\_UE\_PUCCH}$.

$PL_C$ is a pathloss value at the cell c, and is estimated by the UE. This value may be estimated by the UE on the condition that reception power of a cell-specific reference signal (CRS) is measured.

$h(n_{CQI}, n_{HARQ}, n_{SR})$ is a value dependent upon a PUCCH format, $n_{CQI}$ is the number of bits indicating channel quality information, $n_{HARQ}$ is the number of HARQ bits, and $n_{SR}$ has a value of 1 if the subframe i is set for scheduling request and has a value of 0 if not so. $h(n_{CQI}, n_{HARQ}, n_{SR})$ is dependent upon the PUCCH format. In more detail, i) $h(n_{CQI}, n_{HARQ}, n_{SR})$ is set to 0 in the case of PUCCH formats 1, 1a, and 1b, ii) $h(n_{CQI}, n_{HARQ}, n_{SR})$ is set to $$\frac{(n_{HARQ} - 1)}{2}$$

if one or more serving cells are used in the PUCCH format 1b, and iii) $h(n_{CQI}, n_{HARQ}, n_{SR})$ is set to $$10\log_{10}\left(\frac{n_{CQI}}{4}\right)$$

if general cyclic prefix (CP) is used in the PUCCH formats 2, 2a and 2b.

$\Delta_{F\_PUCCH}(F)$ is signaled from a higher layer in consideration of MCS. In more detail, $\Delta_{F\_PUCCH}(F)$ indicates the necessity of different signal-to-noise interference ratios (SINR) in response to not only the number of bits per subframe of the PUCCH format but also different error rates.

$\Delta_{TxD}(F')$ is a power offset signaled from a higher layer when the PUCCH is transmitted using two antenna ports, and is dependent upon the PUCCH format.

g(i) is an accumulation value of the current PUCCH power control adjustment states, and is determined not only by a power value $\delta_{PUCCH}$ corresponding to a transmit power control (TPC) command field value included in a DCI format transmitted through a PDCCH, but also by a PUCCH power control adjustment state value g(i−1) of a previous subframe.

Subsequently, the PUSCH power control under the condition that PUCCH transmission is not performed may be determined by the following Equation 3.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{Bmatrix} \quad [\text{Equation 3}]$$

$$[dBm]$$

$P_{CMAX,c}(i)$ represents a maximum transmission power of the UE, and $M_{PUSCH,c}(i)$ represents a PUSCH transmission bandwidth denoted by the number of RBs.

$P_{O\_PUCCH,c}(j)$ is a desired PUSCH transmission power value to be received by the base station. This value is determined to be the sum of nominal power values $P_{O\_NOMINAL\_PUCCH}$ and $P_{O\_UE\_PUCCH}$. In the case of semi-persistent scheduling, j is set to 0 (j=0). In the case of dynamic scheduling, j is set to 1 (j=1). In the case of a random access response, j is set to 2 (j=2).

$\alpha_c(j)\cdot PL_c$ is a downlink pathloss, where $PL_c$ is estimated by the UE, and $\alpha_c(j)$ is a pathloss compensation value transmitted through higher layer signaling. In the case of j=0 or j=1, $\alpha_c(j)\in\{0, 0.4, 0.5, 0.6, 0.7, 0.8, 0.9, 1\}$ is achieved. In the case of j=1, $\alpha_c(j)=1$.

$\Delta_{TF,c}(i)$ is calculated not only using a value transmitted through higher layer signaling, but also using BPRE (Bit Per Resource Element), CQI, PMI, etc.

$f_C(i)$ is an accumulation value and is determined by various parameters, for example, a power value $\delta_{PUSCH}$ corresponding to a TPC command field value included in a DCI format transmitted on PDCCH, a value of $K_{PUSCH}$ depending upon setting values such as FDD, TDD, etc., and an accumulation value $f_C(i-1)$ extended to a previous subframe.

If PUCCH transmission is performed along with PUSCH transmission, the PUSCH power control is expressed by the following Equation 4.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \text{[dBm]}$$ [Equation 4]

$\hat{P}_{CMAX,c}(i)$ is a linear value for the value $P_{CMAX,c}(i)$, and $\hat{P}_{PUCCH}(i)$ is a linear value for PUCCH power control decided by the Equation 2. The remaining parameters have already been disclosed and as such a detailed description thereof will be omitted herein for convenience of description.

Interference Status and Sudden Switching of Transmission Power

In the aforementioned description, the parameter $\delta_{PUCCH}$ or $\delta_{PUSCH}$ related to the transmission power may be indicated as a specific value by a TPC field. The indicated parameter value may be used for transmission power determination/control in a way of accumulation (in case of PUSCH, PUCCH, and SRS) or an absolute value (PUSCH). However, the conventional transmission power determination defined as above may have a difficulty in its application to some interference statuses which newly occur. In more detail, in case of the accumulation, since a step size of the parameter values related to the transmission power is not great, it may be difficult to perform sudden power switching.

Figure 8:
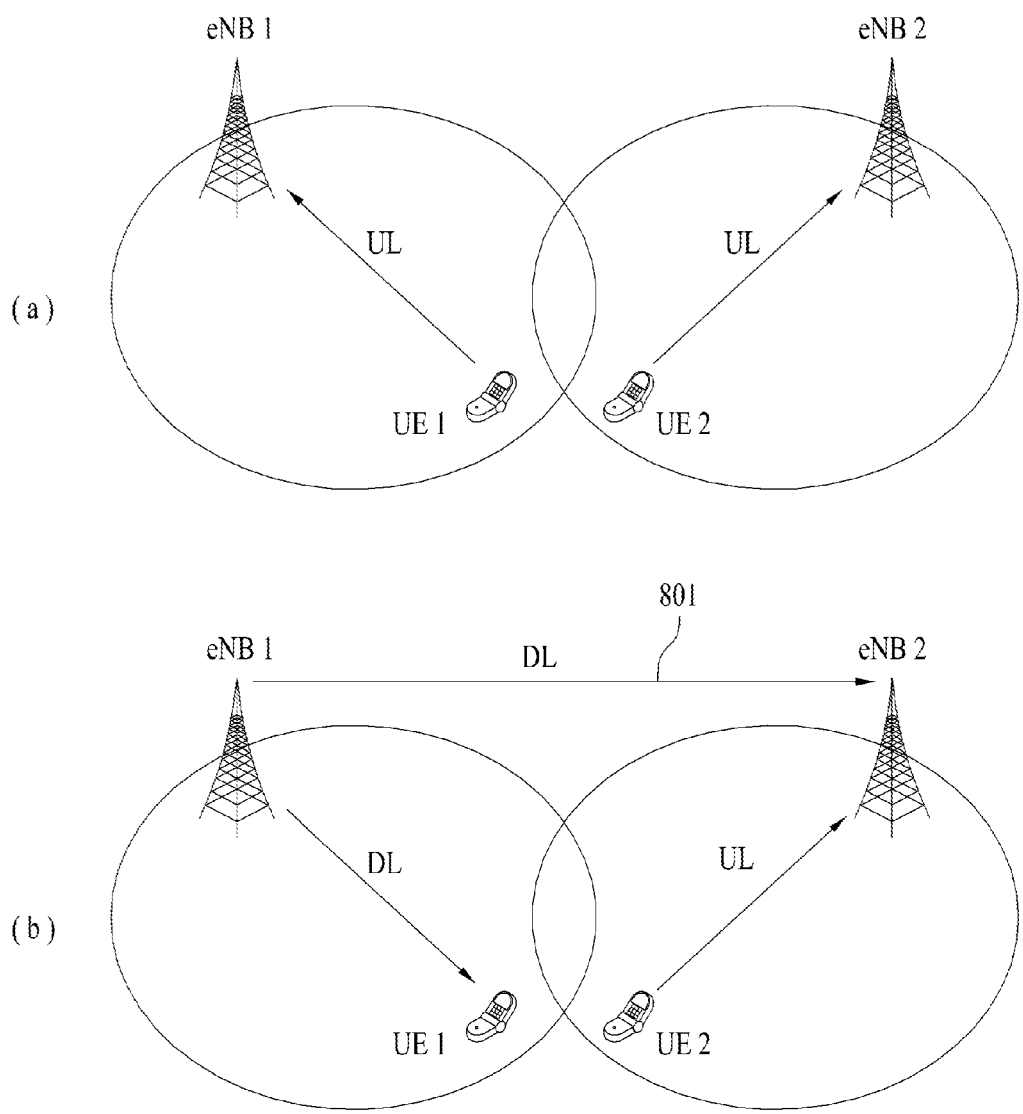
FIGS. 8 and 9 are diagrams illustrating the embodiment of the present invention.

For example, since two neighboring base stations eNB1 and eNB2, which are operated in accordance with a TDD mode as shown in FIG. 8(a), use the same uplink-downlink subframe configuration, there is no special problem in interference between the base stations. However, if eIMTA as described above is applied, the interference status is varied. In more detail, as shown in FIG. 8(b), if the second base station eNB2 switches subframes indicated for the downlink on the system information to those for the uplink and use the subframes, or if the first base station eNB1 switches subframes indicated for the uplink on the system information to those for the downlink and use the subframes, a downlink signal 801 transmitted by the first base station eNB1 may act as interference 801 on uplink reception from the second user equipment UE2 which belongs to the second base station. In this case, in order to receive an uplink signal of the second base station, the second user equipment may enhance the transmission power and then transmit the enhanced transmission power. To this end, it is required that the parameter values related to the conventional uplink transmission power should be changed. For another example, if a plurality of small cells having small coverage are installed for load distribution, each cell may repeat on/off operation in view of management. In this case, an interference status of cells adjacent to the corresponding cell may be varied. For this reason, a power switching that can not be covered by the step size of the parameter values related to the conventional transmission power may be required. Therefore, methods for receiving a switching of a transmission power under the interference status as above will be described.

Embodiment 1

In order to solve the aforementioned problems, the step size of the parameter values related to the transmission power may be applied to each of a case where the transmission power should be switched rapidly and a case where the transmission power is not required to be switched rapidly. In other words, a step size applied to a specific resource region (time/frequency) of a specific user equipment may be changed. In this case, the step size may be defined previously or may be indicated to the user equipment through specific signaling. Also, the step size may be defined/transferred UE-specifically or cell-specifically. The specific resource region may mean a region to which a specific step size is applied in the time/frequency domain. The specific step size may be applied to only a specific PRB pair of a specific subframe (set). For example, if an uplink transmission power is highly increased (needed to be increased) at a specific subframe and the increased transmission power level is maintained, the specific step size may be configured in such a manner that the specific step size is used from a subframe (or subframe N (the time when uplink transmission power is significantly increased) corresponding to the time when the uplink transmission power is significantly increased to a subframe N+K (K is an integer), and the conventional step size is used for the other subframes. This configuration may be transferred through higher layer signaling.

Otherwise, if a new uplink-downlink subframe configuration is indicated through a physical layer signal in addition to SIB in eIMTA, a step size which will be applied to a period (all or part) to which the uplink-downlink subframe configuration is applied may exist. This may be included in a reconfiguration message. At this time, the corresponding step size may be maintained for a reconfiguration period, or may be applied to only specific subframe(s) after reconfiguration.

Otherwise, if the base station notifies the user equipment of a duplex direction of a serving cell and a neighboring cell in the form of a subframe set, the user equipment may determine a step size which will be applied at a specific subframe set (which is a region where interference is varied and may be devised by the user equipment) on the basis of the notified duplex direction. In more detail, supposing that subframes that maintain the same duplex direction as a configuration designated by system information SIB 1 are static subframes and subframes at which the duplex direction designated by SIB may be varied/is varied are flexible subframes, a great power switching may be required at the time when the static subframes are switched to the flexible subframes or vice versa. In this case, the changed step size may be used. The base station may signal information as to how many time periods the step size will be applied to the above case.

In the aforementioned description, usage/application of the step size may be understood that a set of the parameter value $\delta_{PUCCH}$ or $\delta_{PUSCH}$ related to the transmission power is changed. In more detail, if there is no great switching in the transmission power, a second set of the following Table 6 may be used, and if there is a great switching in the transmission power, a first set or a third set may be used. In more detail, the first set may be applied if it is required to highly increase the transmission power, and the third set may be applied if it is required to highly reduce the transmission power. Also, as illustrated, the first set may be configured by an integer multiple of the second set. Alternatively, the first set may be configured as positive numbers only unlike the illustrated example. Likewise, the third set may be configured as negative numbers only. In the following example set, an absolute value (that is, step size) of a difference between two values is only examplary, and the user equipment may actively determine the absolute value as described above.

TABLE 6

| TPC command Field in DCI format 0/3/4 | TPC command Field in DCI format | Accumulated $\delta_{PUCCH}$ or $\delta_{PUCCH}$ [dB] | | |
|---|---|---|---|---|
| | | First set | Second set | Third set |
| 0 | 0 | −4 | −1 | −9 |
| 1 | 1 | 0 | 0 | −3 |
| 2 | 2 | 4 | 1 | 0 |
| 3 | 3 | 12 | 3 | 3 |

The parameter value related to the transmission power is indicated by a TPC command, and if the user equipment transmits the PUSCH, the TPC command may be transferred through DCI formats 0/3/4 together with resource allocation (uplink grant). Also, if the user equipment transmits the PUCCH, the TPC command may be transferred through any one of DCI formats 1A, 1B, 1D, 1, 2A, 2B, 2C, 2D, 2, and 3 together with downlink resource allocation.

Figure 9:
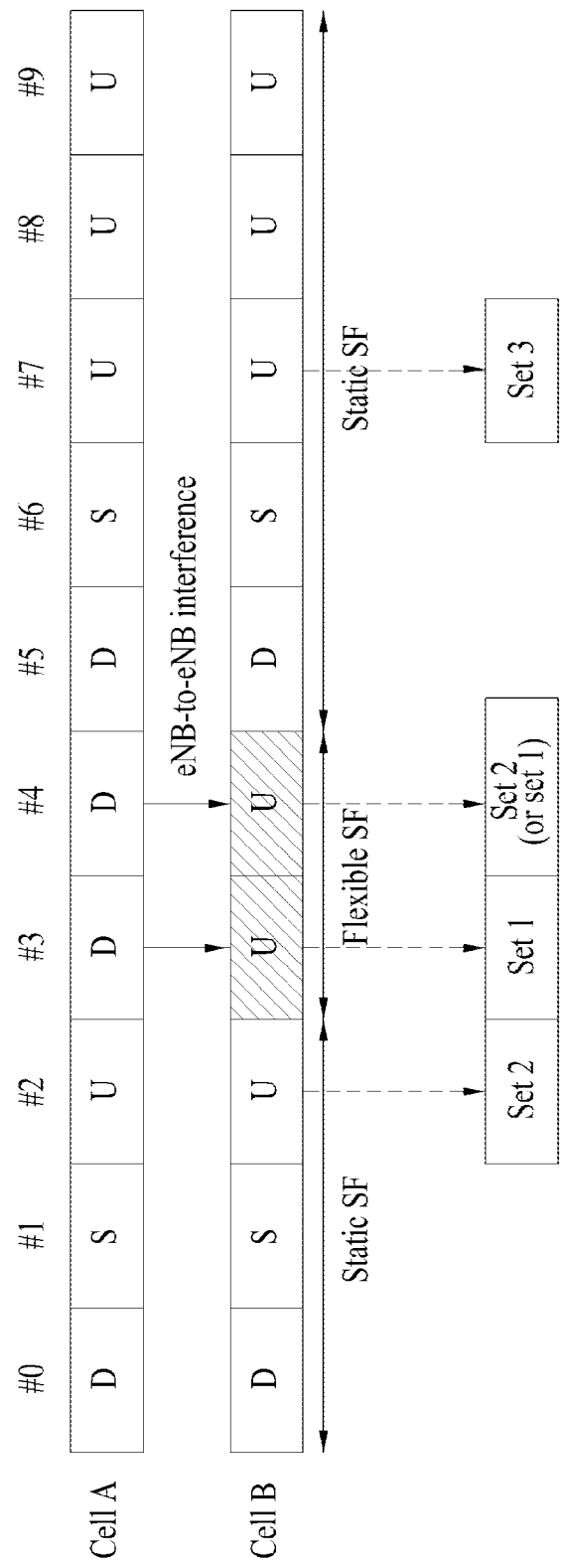

A detailed example related to the description of the aforementioned embodiment 1 is shown in FIG. 9. In FIG. 9, uplink-downlink subframe configuration 0 is signaled as system information, and in accordance with eIMTA application in cell A, subframes #3 and #4 indicated for the uplink on the system information are used by being switched to downlink subframes. In this case, at the subframes #3 and #4 used by being switched to the downlink subframes, cell B will be subjected to interference caused by a downlink signal of the cell A. In order to reduce such interference, the user equipment of the cell B (serving cell) may highly increase the transmission power during uplink signal transmission at the first subframes (#3 and #4) corresponding to the subframes used for the downlink by the neighboring cell (cell A). At this time, the first set may be used as the parameter value set related to the transmission power. In other words, when transmitting the uplink signal through allocated resources, the user equipment may use the first set different from the second set, which includes the parameter value related to the transmission power used at normal uplink subframes (second subframes) if the subframes corresponding to the first subframes, which include the allocated resources, are used by being switched to those for the downlink in the neighboring cell (cell A). In this case, the second subframes may be subframes (subframes #2, #8 and #9) other than the first uplink subframe (subframe #7), which appears after the first subframes among the subframes of the serving cell (cell B) corresponding to the subframes (subframes #2, #7, #8 and #9 of FIG. 9 indicated for uplink transmission on the system information) used for uplink transmission in the neighboring cell (cell A). The aforementioned description will be applied to the detailed description of the first set, the second set, and the third set.

Subsequently, the user equipment may selectively use the first set or the second set at next subframes of the first subframes. For example, if increase of the accumulated transmission power value is not sufficient at the first subframes, the first set may be used again. The third set may be used at the first uplink subframe (subframe #7). This may be intended to rapidly reduce the transmission power increased rapidly at the first subframes. If the transmission power should be reduced at a great width, the third set may be used again even at next subframe of the first uplink subframe (subframe #7).

Embodiment 2

In the second embodiment, the step size is not changed, and switching of TPC types (accumulation type and absolute value type) is used.

TPC types may be transferred using RRC signaling, etc. The user equipment may switch TPC interpretation methods of an accumulation type and an absolute value type (in a region designated by the base station or a region devised on the basis of information notified from the base station). (To this end, the time when a scheme for switching TPC types is activated/deactivated may be transferred (through higher layer signaling, etc.), or if a subframe set for measurement is signaled, the TPC interpretation methods may be switched on the basis of the corresponding measurement set.) However, the above method has a problem in that it is difficult to apply the above method to a case where a power switching highly exceeds a range of the conventional step size. To solve this problem, DCI formats (for example, DCI formats 0/3/3A) may be transmitted at a downlink subframe (for example, DL stand alone subframe) to which uplink grant is not transmitted. For example, if three downlink subframes (for example, UL ACK/NACK timeline based association) associated with a specific (uplink) subframe (for example, SF #n) exist and one of the three downlink subframes is a DL stand along subframe, power configuration related to uplink data transmitted at the specific (uplink) subframe timing (for example, SF #n) may be implemented by the sum of a power configuration value (or power configuration value summed up to reach the time when scheduling information (for example, uplink grant) on corresponding uplink data transmission is transmitted) at the time when scheduling information (for example, UL grant) on corresponding uplink data transmission is transmitted and a power configuration value transmitted at the DL stand along subframe. In this case, for example, the DL stand alone subframe may be the DL stand along subframe closest to the time prior to 4 ms from the time when corresponding uplink data transmission is performed. At this time, the other information except the TPC of the information included in the uplink grant may include the same information as that of the previous UL grant, or may be disregarded by the UE.

The aforementioned description may be applied to even downlink power control. For example, if uplink subframes on system information in eIMTA are used by being switched to downlink subframes, a rapid transmission power switching (use of low transmission power to protect uplink transmission of neighboring cell) may be required. In this case, a parameter configured for the conventional downlink power control may be regarded that a specific offset value is applied to the corresponding parameter, and the time when the offset is activated/deactivated may be transferred through higher layer signaling. (In this case, activation does not mean that offset is immediately applied but means that offset may be applied at a subframe for which transmission power should be switched significantly after activated time.) Also, offset may be applied to parameters $P_{O\_PUSCH}$, $P_{O\_PUCCH}$, $P_{O\_SRS}$, and $\alpha_C$ related to the uplink transmission power. Moreover, the aforementioned descriptions may be applied to even an FDD system corresponding to a case where big switching of a transmission power occurs in accordance with a change of an interference condition.

Configuration of Apparatus According to the Embodiment of the Present Invention

Figure 10:
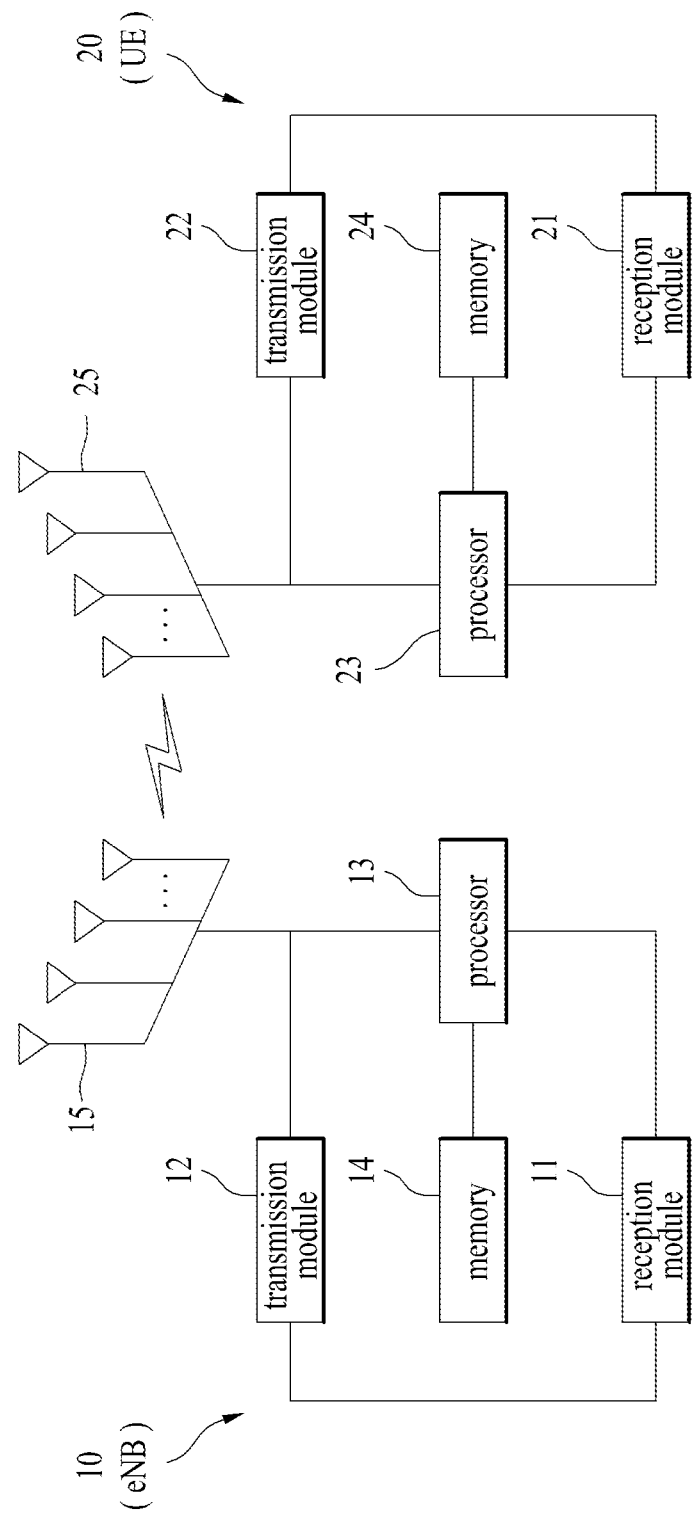
FIG. 10 is a diagram illustrating a configuration of a transceiving apparatus.

FIG. 10 is a diagram illustrating configurations of a transmission point and a user equipment UE according to one embodiment of the present invention.

Referring to FIG. 10, a transmission point 10 according to the present invention may include a reception module 11, a transmission module 12, a processor 13, a memory 14, and a plurality of antennas 15. The plurality of antennas 15 mean the transmission point that supports MIMO transmission and reception. The reception module 11 may receive various signals, data and information on an uplink from the user equipment. The transmission module 12 may transmit various signals, data and information on a downlink to the user equipment. The processor 113 may control the overall operation of the transmission point 10.

The processor 13 of the transmission point 10 according to one embodiment of the present invention may perform operations necessary for the embodiments described above.

The processor 13 of the transmission point 10 may function to computationally process information received by the transmission point 10 or information to be transmitted to the outside, etc. The memory 14, which may be replaced with an element such as a buffer (not shown), may store the computationally processed information for a predetermined time.

Subsequently, referring to FIG. 10, the user equipment UE 20 according to the present invention may include a reception module 21, a transmission module 22, a processor 23, a memory 24, and a plurality of antennas 25. The plurality of antennas 25 mean the user equipment that supports MIMO transmission and reception. The reception module 21 may receive various signals, data and information on a downlink from a base station eNB. The transmission module 22 may transmit various signals, data and information on an uplink to the base station. The processor 23 may control the overall operation of the user equipment 20.

The processor 23 of the user equipment 20 according to one embodiment of the present invention may perform operations necessary for the embodiments described above.

The processor 23 of the user equipment 20 may function to computationally process information received by the user equipment 20 or information to be transmitted to the outside, and the memory 24, which may be replaced with an element such as a buffer (not shown), may store the computationally processed information for a predetermined time.

The configurations of the transmission point and the user equipment as described above may be implemented such that the above-described embodiments are independently applied or two or more thereof are simultaneously applied, and description of redundant parts will be omitted for clarity.

Also, description of the transmission point 10 in FIG. 10 may also be applied to a relay which serves as a downlink transmitter or an uplink receiver, and description of the user equipment 20 may be equally applied to a relay which serves as a downlink receiver or an uplink transmitter.

The aforementioned embodiments of the present invention may be implemented through various means, for example, hardware, firmware, software, or a combination thereof.

When implemented by hardware, the method according to the embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

The invention claimed is:

1. A method for transmitting an uplink signal by a user equipment in a wireless communication system, the method comprising:

being allocated with resources for transmitting the uplink signal from a serving cell; and transmitting the uplink signal through a first subframe including the allocated resources, wherein, when a subframe corresponding to the first subframe is used for downlink transmission in a neighboring cell of the serving cell, a first set comprising parameter values associated with a transmission power for the first subframe is different from a second set comprising parameter values associated with a transmission power for uplink signal transmission through a second subframe corresponding to a subframe used for an uplink in the neighboring cell, wherein an absolute value of a difference between two of the parameter values included in the first set is greater than an absolute value of a difference between two of the parameter values included in the second set.

2. The method according to claim 1, wherein each of the parameter values included in the first set is an integer multiple of each of the parameter values included in the second set.

3. The method according to claim 1, wherein the first set includes only the parameter values corresponding to positive numbers.

4. The method according to claim 1, wherein the second subframe are those other than a first uplink subframe which appears after the first subframe among the subframe corresponding to those used for the uplink in the neighboring cell.

5. The method according to claim 4, wherein a third set comprising parameter values associated with a transmission power at the first uplink subframe which appears after the first subframe is different from the first set and the second set.

6. The method according to claim 5, wherein the third set includes only the parameter values corresponding to negative numbers.

7. The method according to claim 1, wherein the parameter values are indicated by a transmit power control (TPC) command field.

8. The method according to claim 7, wherein, when the uplink signal is transmitted through a physical uplink shared channel (PUSCH), the TPC command is received together with the resource allocation.

9. The method according to claim 8, wherein the TPC command is received through a control channel of a first downlink subframe among subframes prior to four subframes from the first subframe.

10. The method according to claim 7, wherein, when the uplink signal is transmitted through a physical uplink control channel (PUCCH), the TPC command is received together with downlink resource allocation.

11. The method according to claim 10, wherein the TPC command is included in any one of downlink control information formats 1A, 1B, 1D, 1, 2A, 2B, 2C, 2D, 2, and 3.

12. A user equipment for transmitting an uplink signal in a wireless communication system, the user equipment comprising:
a transmission module; and
a processor connected with the transmission module,
wherein the processor is configured to be allocated with resources for transmitting the uplink signal and transmits the uplink signal through the allocated resources, and
control the transmission module to transmit the uplink signal through a first subframe including the allocated resources,
wherein when a subframe corresponding to the first subframe is used for downlink transmission in a neighboring cell of the serving cell, a first set comprising parameter values associated with a transmission power for the first subframe is different from a second set comprising parameter values associated with a transmission power for uplink signal transmission through a second subframe corresponding to a subframe used for an uplink in the neighboring cell,
wherein an absolute value of a difference between two of the parameter values included in the first set is greater than an absolute value of a difference between two of the parameter values included in the second set.

* * * * *